(12) United States Patent
Khazanov et al.

(10) Patent No.: US 8,707,193 B2
(45) Date of Patent: Apr. 22, 2014

(54) REMOTE MONITORING SYSTEM AND METHOD

(75) Inventors: Yuri Khazanov, Northbrook, IL (US); Alexander Fridland, Northbrook, IL (US)

(73) Assignee: Incheck Technologies, Inc., Northbrook, IL (US)

( * ) Notice: Subject to any disclaimer, the term of this patent is extended or adjusted under 35 U.S.C. 154(b) by 202 days.

(21) Appl. No.: 12/781,530

(22) Filed: May 17, 2010

(65) Prior Publication Data

US 2010/0293493 A1  Nov. 18, 2010

Related U.S. Application Data

(60) Provisional application No. 61/178,666, filed on May 15, 2009.

(51) Int. Cl.
*G06F 3/00* (2006.01)

(52) U.S. Cl.
USPC ............ 715/771; 715/810; 715/764; 715/776

(58) Field of Classification Search
USPC .................................. 715/810, 764; 725/771
See application file for complete search history.

(56) References Cited

U.S. PATENT DOCUMENTS

| | | | | |
|---|---|---|---|---|
| 5,610,339 | A * | 3/1997 | Haseley et al. ................. | 73/660 |
| 5,845,230 | A * | 12/1998 | Lamberson ..................... | 702/56 |
| 6,041,287 | A | 3/2000 | Dister et al. | |
| 6,199,018 | B1 | 3/2001 | Quist et al. | |
| 6,257,066 | B1 * | 7/2001 | Chandler et al. ................ | 73/660 |
| 6,484,109 | B1 | 11/2002 | Lofall | |
| 6,591,296 | B1 * | 7/2003 | Ghanime ...................... | 709/224 |
| 7,110,918 | B2 * | 9/2006 | Celestini ....................... | 702/186 |
| 7,142,990 | B2 | 11/2006 | Bouse et al. | |
| 7,283,914 | B2 | 10/2007 | Poorman et al. | |
| 7,406,399 | B2 | 7/2008 | Furem et al. | |
| 7,409,261 | B2 | 8/2008 | Jalluri et al. | |
| 7,574,320 | B2 | 8/2009 | Corwin et al. | |
| 7,606,681 | B2 * | 10/2009 | Esmaili et al. ................. | 702/187 |
| 7,677,869 | B2 | 3/2010 | Martinez De Lizarduy Romo et al. | |
| 7,689,394 | B2 | 3/2010 | Furem et al. | |
| 2004/0128084 | A1 * | 7/2004 | Keech ............................. | 702/57 |
| 2005/0184879 | A1 * | 8/2005 | McPherson et al. .......... | 340/604 |
| 2007/0175283 | A1 * | 8/2007 | Nelson et al. .................... | 73/655 |
| 2007/0255250 | A1 * | 11/2007 | Moberg et al. ................ | 604/503 |
| 2009/0149981 | A1 * | 6/2009 | Evans et al. .................... | 700/110 |
| 2009/0271725 | A1 * | 10/2009 | Dirla ............................. | 715/771 |
| 2009/0295571 | A1 * | 12/2009 | Hosey ........................... | 340/540 |

OTHER PUBLICATIONS

"Planning for RF Noise Pollution," Globalspec.com, The Engineering Search Engine, Industry Trends & Events—Feb. 7, 2008—vol. 3, Issue 2.
Yuri Khazanov, "InCheck Technologies Improves Asset Management With Online Service Model," PR.com Press Release, Northbrook, Illinois, May 15, 2008.
Yuri Khazanov, "System Provides Online Condition Monitoring Solution," ThomasNet.com, May 15, 2008.

\* cited by examiner

*Primary Examiner* — Amy Ng
*Assistant Examiner* — Erik Stitt
(74) *Attorney, Agent, or Firm* — Greer, Burns & Crain, Ltd.

(57) ABSTRACT

A remote monitoring system including a sensor configured to take measurements of a physical parameter of an associated machine, a data acquisition module configured to gather machine data from the sensor, an application server in communication with the data acquisition module across a network, a database in communication with the application server and configured to receive and store the machine data from the data acquisition module across the network, and an interface configured to facilitate communication between a user and the machine data maintained in the database, wherein the machine data stored in the database is accessible to the user connected to the network in real-time.

19 Claims, 5 Drawing Sheets

REMOTE MONITORING SYSTEM AND METHOD

PRIORITY

This application claims priority under 35 U.S.C. §119(e) to the provisional application filed on May 15, 2009 and having application No. 61/178,666.

FIELD OF THE INVENTION

The present application relates to a system for remotely monitoring machine data.

BACKGROUND OF THE INVENTION

In the manufacturing, process, power generation, and other industries, machines are used to perform various tasks. Machine operating conditions may deteriorate over time due to wear, contamination, lack of proper maintenance, or other factors. To confirm that these machines are working properly and avoid costly unexpected breakdowns, sensors and other related devices are used to gather and present data regarding the operation or condition of the machines. In traditional online monitoring systems, machines grouped together within a single plant or factory, have sensors that are hardwired to a local, central computer, which stores the machine data. To access the gathered machine data, a maintenance specialist typically uses the local computer and therefore needs to be physically present in the plant. To present data to a remote user, one must take a snapshot of the machine data and send it to the remote user. However, such data only represents static machine data from a given point in time.

SUMMARY OF THE INVENTION

In an effort to address the above-identified drawbacks, the present remote monitoring system provides a machine with data sensors coupled to a data acquisition module. The module is then coupled to an application server across a standard LAN/WAN/Internet network. An integrated database is provided by the application server for storing the machine data so that it is accessible by anyone connected to the network. As such, a user remotely connects to the network using conventional means and gains access to the machine data in real-time.

A graphical user interface is provided to the remote user whereby the user accesses the machine data in real-time using a standard web browser. Further, the user dynamically accesses data by triggering select data calculations upon the user's request. As such, the user is able to remotely perform real-time data analysis.

More specifically, the present remote monitoring system includes a sensor configured to take measurements of a physical parameter of an associated machine and output an electric signal representing the value of said parameter, a data acquisition module configured to gather machine data from the sensor, an application server in communication with the data acquisition module across a network, a database in communication with the application server and configured to receive and store the machine data from the data acquisition module across the network, and an interface configured to facilitate communication between a user and the machine data maintained in the database, wherein the machine data stored in the database is accessible to the user connected to the network in real-time.

DETAILED DESCRIPTION OF THE DRAWINGS

DETAILED DESCRIPTION OF THE INVENTION

Figure 1:
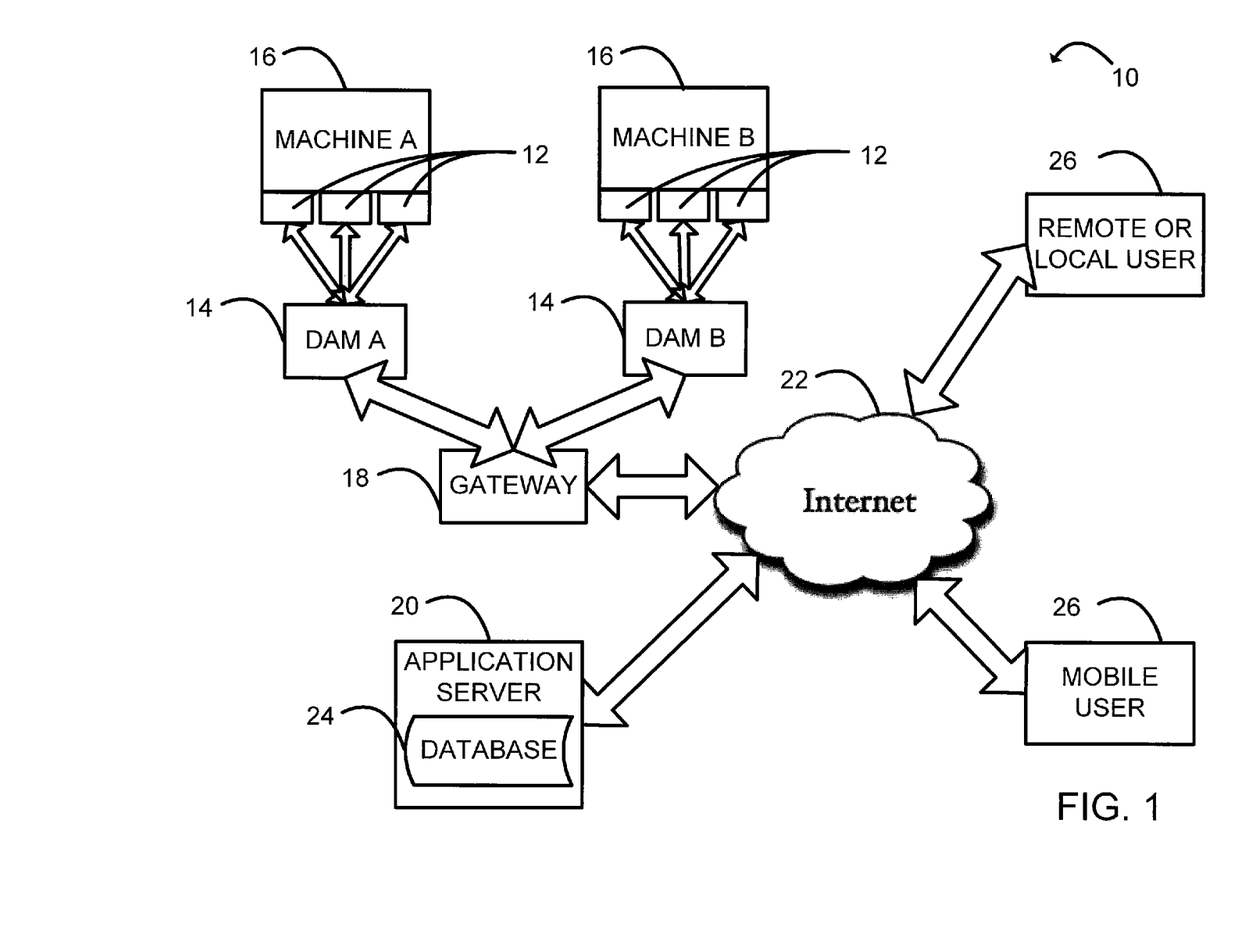
FIG. 1 illustrates a schematic view of the networked components of a preferred embodiment of the present remote monitoring system.

Referring now to FIG. 1, a schematic view is provided of the networked components of a preferred embodiment of the present remote monitoring system, generally designated 10. In the remote monitoring system 10, sensors 12 work in conjunction with data acquisition modules ("DAMs") 14 to gather machine data from associated machines 16. The sensors 12 perform the physical measurements (e.g., temperature, speed, vibration and the like), while the DAM 14 gathers machine data based on these measurements. In particular, the DAM 14 gathers the electric signal from the sensor 12 and converts it into a digital form.

While various designs of DAMs 14 are considered compatible with the present remote monitoring system 10, specifications for a preferred DAM are described below. The preferred DAM 14 has up to 16 data channels, each channel accepting one sensor signal. The number of channels may vary to suit the application. The DAMs 14 can directly accept analog voltage signals from sensors within a specified range or may be provided with external signal conditioning modules to interface with various additional types of sensors, such as accelerometers, thermocouples, restrictive temperature detectors, pressure sensors and others, with the ability to mix and match different input channels in one module.

As data is acquired, the DAMs 14 maintain preferred select data acquisition parameters as required by an application and selected by user. The data is acquired with 16 bit resolution, and a maximum sampling rate of 102.4 kHz. The DAMs 14 also include a compound analog and digital anti-aliasing filter for vibration data measurements.

The DAMs 14 preferably communicate with the application server 20 over a wired (e.g., Ethernet) or wireless (e.g., Wi-Fi) connection and over the Internet through a local network gateway, using a static or DHCP addressing technique, and a TCP/IP protocol. Preferably, a DAM automatically connects to the server as a client. It is also contemplated that the sensor 12 and DAM 14 be integrated into a single component, which preferably transmits data over a wireless connection.

In preferred embodiments, the DAMs 14 are installed at machine floor near the machines being monitored. They are built to operate in industrial environment in the temperature range −40 to +85 degrees Celsius. The DAMs 14 preferably use a dust and water protected enclosure suitable for an industrial environment. The preferred dimensions of a DAM 14 are 7"×5"×3" (for a 4-channel DAM). Notably, while a preferred DAM 14 uses the above recited settings and specifications, the DAMs 14 used in the present invention are not so limited. Indeed, the recited specifications only describe one example of a DAM 14 embodiment.

Turning back to FIG. 1, once the machine data is acquired by the DAMs 14, it is sent to an application server 20 over a standard network 22 (e.g., LAN/WAN/Internet). Preferably the DAMs 14 use wireless protocols to transfer machine data to reduce physical wiring restrains or other complications during installation.

The application server 20 receives and stores the machine data uploaded by the DAMs 14 and sent over the network 22. Included in the application server 20 is an integrated database 24 for storing the machine data received through the network 22. This configuration eliminates the need for the application server 20 to be physically positioned in close proximity to the machines 16, sensors 12 and DAMs 14. Indeed, provided the application server 20 has access to the network 22 (i.e., has a standard network connection), the application server 20 can receive and store the machine data regardless of its physical location. In some embodiments, multiple application servers 20 and databases 24 are used to facilitate effective storage and transfer of data.

A user 26 need only be connected to the network 22 to accesses the machine data. As such, the user's physical location relative to the application server 20 does not affect the user's ability to view and/or interact with the machine data in real-time. Examples of various types of users are shown in FIG. 1, including for example a remote or local user (e.g., at a desktop workstation) and a mobile user 26 (e.g., a mobile phone). As described above, these example users 26 only need to have access to the network 22 to access the machine data, even if the machine data 28 resides on a physically remote application server 20. Notably, the network topology of the present remote monitoring system 10 is not limited to the example shown in FIG. 1. Indeed, various combinations of network components (e.g., network switches, routers, etc.) could be used depending on the layout of components and needs of the system. Further, communication of data in the present remote monitoring system 10 is not limited to a particular transmission technology. Indeed, any type of transmission could be used with the present system 10 (i.e., wired or wireless).

Figure 2:
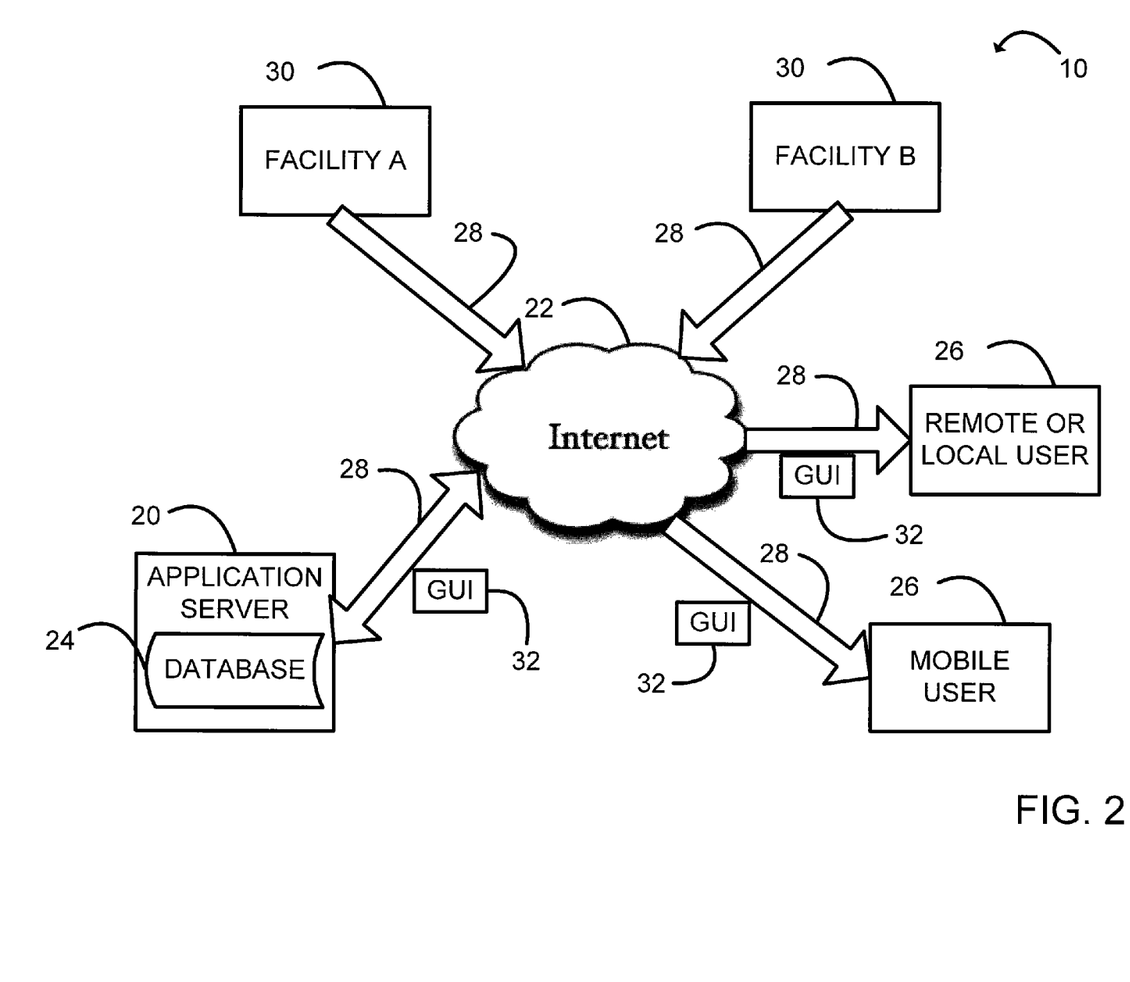
FIG. 2 illustrates a schematic view of the data flow paths between the network components of a preferred embodiment of the present remote monitoring system.

Referring now to FIG. 2, a schematic view of the data flow paths between the network components of a preferred embodiment of the present remote monitoring system 10 is shown. Machine data 28 originates from one or more facilities 30 (which contain the sensors 12, machines 16 and DAMs 14 as shown in FIG. 1), and is then sent through the network 22 and stored in the database 24 of the application server 20. The application server 20 provides machine data 28 back to the network 22 and eventually to the user 26 by way of a graphical user interface 32. Notably, references to machine data 28 throughout this application refer not only to the actual data gathered by the sensors 12, but also to any other related data (e.g., user requests for retrieval or calculation of machine data via the graphical user interface 32, the code to present the graphical user interface 32 to the user, etc.).

Preferably, the graphical user interface 32 is implemented using Adobe® Flash® multimedia platform, or similar software protocols/tools (e.g., HTML 5), which is embedded into a standard webpage. As such, the user 26 need not install a specialized application on a computer to access the machine data 28, but instead only needs access to a web browser. By embedding Flash® software within the webpage, the user is provided with a dynamic (i.e., real-time) display of the machine data 28 without the need to "refresh" the webpage.

The user's experience is similar to using traditional monitoring systems. The graphical user interface 32 relies on two components. First, at the hosting end, there is an engine powering the graphical user interface 32, which resides on the application server 20. Using the connection of the application server 20 to the network 22, the graphical user interface 32 is pushed to (i.e., made available on) the network 22 for access by remote users 26. The user 26 (through use of the user's network enabled device) then serves as the second component, as it accesses the graphical user interface 32 made available over the network 22.

As described above, in traditional systems, a remote user is limited to taking static snapshots of the machine data at a particular time, rather than having access to real-time machine data as in the present invention. The ability to access real-time machine data also allows the user to perform "on-the-fly" calculations and data analysis, including for example, calculations for vibration analysis and data trends.

Figure 3:
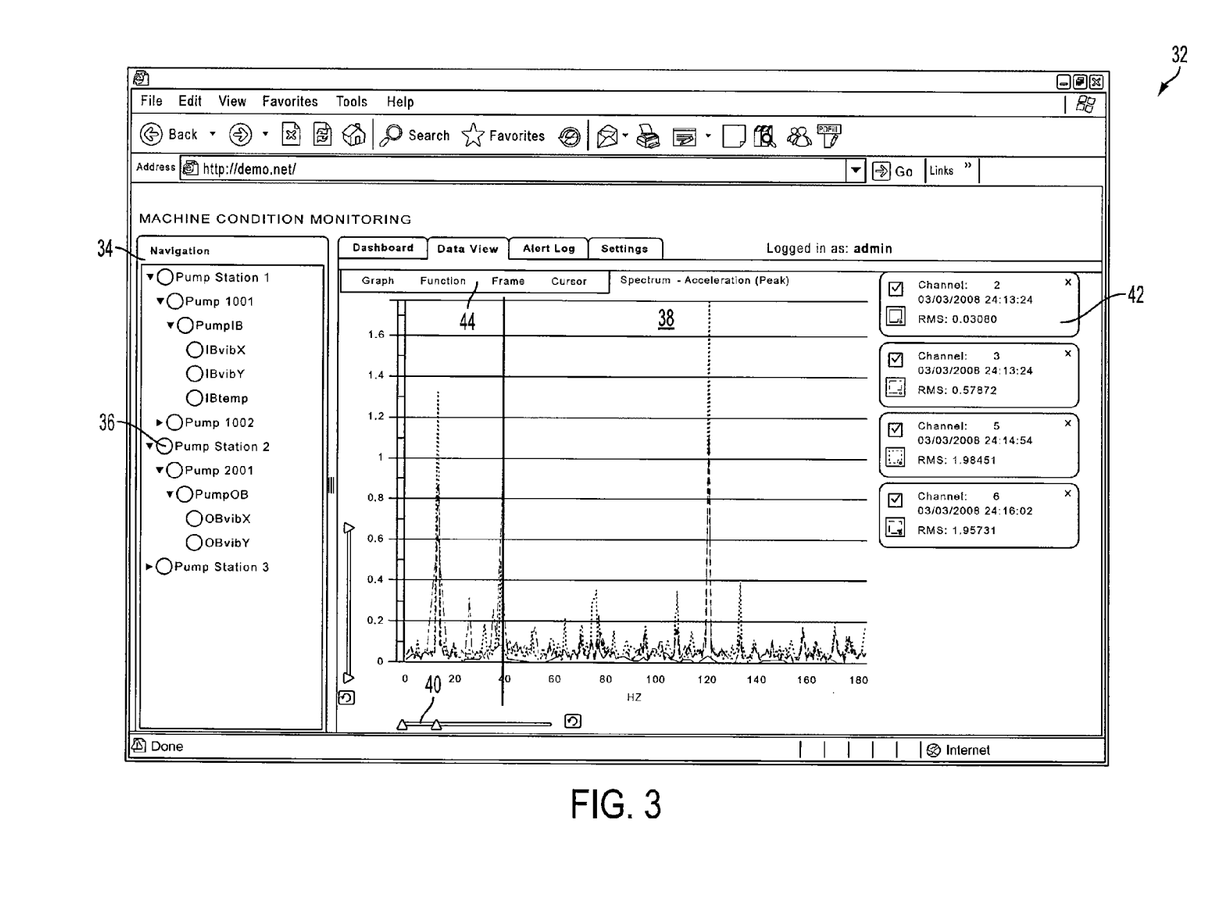
FIG. 3 illustrates a first example graphical user interface of a preferred embodiment of the present remote monitoring system.
Figure 4:
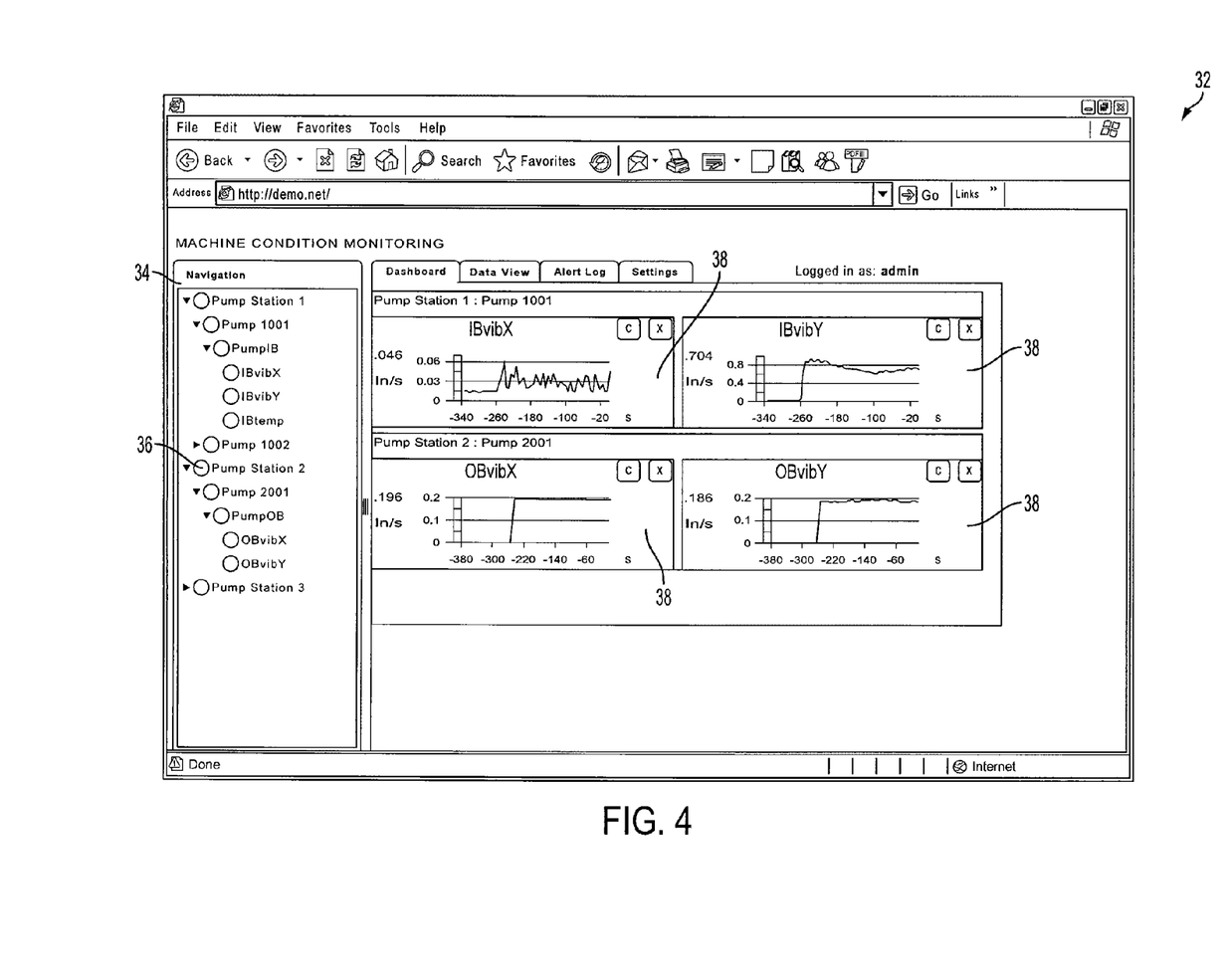
FIG. 4 illustrates a second example graphical user interface of a preferred embodiment of the present remote monitoring system.

Examples of a graphical user interface 32 are shown in FIGS. 3 and 4. As shown in the figures, included among other features in the graphical user interface 32 are interactive navigation trees 34, real time machine status icons 36, dashboard widgets 38 showing real-time machine data, zooming settings 40, data trace selections 42 (to select which sensors 12 to pull data from), and various vibration analysis tools 44.

With a traditional monitoring system, a remote user is unable to interact with the data analysis process (i.e., the user cannot request that a particular calculation be performed, it can only receive predetermined sets of data). On the other hand, in the present remote monitoring system 10, the user 26 requests that a particular calculation be performed on the machine data 28 as the user is reviewing and analyzing the displayed data. Such interaction improves efficiency of the remote monitoring system 10 as certain machine data 28 calculations are only performed when needed (i.e., when requested by the user 26). Notably, in addition to providing real-time data, the present remote monitoring system 10 also provides historical data. These two sets of data are compared and used to provide the user 26 with additional information regarding the condition of the machines. For example, that based on a comparison test, it may be determined that vibration levels of a particular machine have changed over time, indicating a potential impending machine failure.

Further, the user 26 controls how the machine data 28 is collected for analysis. For example, machine data 28 samples may by default be collected every hour for archiving purposes. However, when a user 26 is investigating a problem with the machines 16, the user 26 can request machine data 28 collected more often for particular channels (sensors) to gain a better understanding of how that particular machine or component is behaving. Such a request is sent by the user 26 to the application server 20 via a graphical user interface 32, which in turn sends a command to the appropriate DAM 14 requesting an increase in the rate of data collection of the corresponding machine data 28. Summarily, the present system provides facilities for data analysis that are typically available only with either portable vibration analyzers or with permanent monitoring systems at their place of installation. The advantage of the present system is in that the full control over the data collection, storage, and analysis processes can be accessed from any location through a standard web browser. In addition, data from multiple locations can be accessed from one user interface.

Figure 5:
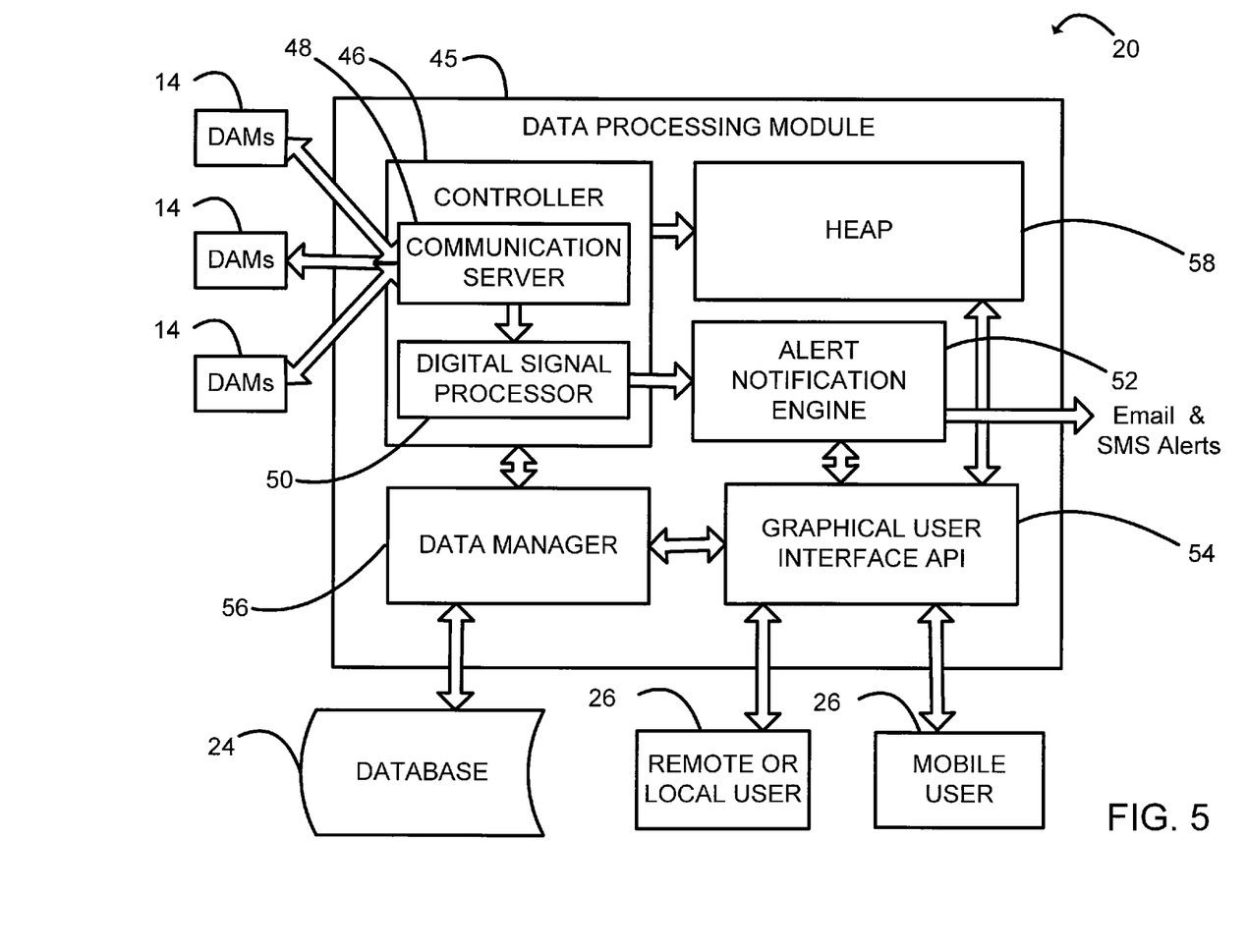
FIG. 5 illustrates a schematic system architecture design view of a preferred embodiment of the present remote monitoring system.

Referring now to FIG. 5, a schematic system architecture design view of a preferred embodiment of the present remote monitoring system 10 is shown. In, particular, FIG. 5 is directed to components of the application server 20, including a data processing module 45 and the database 24. The data processing module 45 facilitates communication between the DAMs 14, the database 24, and the users 26. Included in the data processing module 45 is a controller 46 which acquires machine data from the DAMs 14 using a communication server 48. Such communication is preferably made using a binary protocol over TCP/IP. The machine data is then forwarded to the digital signal processor 50, which analyzes or calculates select data based on the request of the user 26. Examples of a digital signal process 50 includes among others, processes for vibration analysis, such as data filtering, averaging, and calculation of overall values. In addition, unit conversions, calculations of trends, and others are performed. One particular routine of the digital signal processor 50 is for alert generation, which is managed using an alert generation engine 52, configured such that when parameters (i.e., conditions) of the machines 16 become suspect (i.e., fall above or below a predefined threshold value), the remote monitoring system 10 generates and delivers corresponding alerts to the graphical user interface 32 or by other means to inform the user 26 of the issue. Non-limiting examples of such alerts include indicating a status color on the graphical user interface 32 that is associated with a particular portion of the remote monitoring system 10 or sending a notification email or SMS. Preferably, such emails provide an escalating feature whereby emails are continually sent to different users if previous users are not responsive within a predetermine amount of time.

Inputs/requests from users 26 are gathered using a graphical user interface API 54 (which is coupled to the actual displayed graphical user interface 32) maintained in the data processing module 45. The graphical user interface API 54 then forwards the data received to a data manager module 56, which feeds the data into the digital signal processor 50 for data calculation/analysis. Notably, communication is bidirectional for each of the paths described above. In typical "monitoring" applications of the remote monitoring system 10, machine data obtained from the associated sensors 12 is ultimately forwarded to the users 26. However, once the users 26 interact with the system 10 through the graphical user interface 32, the direction of data flow (or at least a portion thereof) is reversed. For example, after reviewing vibration data, the user may request to gather further vibration data with altered parameters (e.g., by increasing the intervals used for measurement). In such case, the user's request initiates from the user 26, moves though the graphical user interface API 54, the data manager 56, and the communication server 48 such that it can be routed to and received by the DAM 14 to modify its physical or logical measuring parameters. As such, the data manager 56 is configured to, among other things, interpret the incoming data and determine where to forward the data.

However, notably the data manager 56 does not blindly forward data 28 from one module to another. Instead, the data manager 56 is configured to interpret the data received, and determine whether any calculations or other actions should be performed before forwarding the data. Depending on the user's instructions, the data manager 56 may employ a digital signal processor 50 function. The data manager 56 further communicates with one or more database 24. Preferably, each database 24 is organized with multiple data sets, including for example monitoring system topology, monitored machines information, specifications, and maintenance manuals, system and measurement configurations; logs, such as system and user event logs, alert log and alert thresholds; security data including user login parameters, preferences, and privileges; and monitoring data, such as dynamic and static data samples along with metadata.

Both the controller 14 and graphical user interface API 54 have access to a heap data structure 58, which serves as a data cache to hold the latest data received and processed by the controller 14. Notably, the setting of how much data (e.g., the last ten minutes of data received) is configurable by the user 26. While recent data is maintained in the heap 58, the full set of historical data is maintained in the database 24. As such, depending on the user's request, data is retrieved from either the heap 58 or database 24. Storing recent (and frequently requested data) in the heap provides for a faster response time and therefore less routing of data. Indeed, preferably the heap is a high speed memory included with the application server 20. Also, in certain instances, the user can request that data from both the heap 58 and the database 24 be shown in the graphical user interface API 54 (i.e., for data comparison purposes).

Throughout this application, all references to a, an, or the, refer to at least one unless otherwise specified. Also, it is preferred that the steps and operations discussed above are performed by a computer program embedded in a memory on the respective components. However, it is noted that the steps could also be carried out by software and/or hardware stored elsewhere within the remote monitoring system 10.

While several particular embodiments of the present remote monitoring system and method have been described herein, it will be appreciated by those skilled in the art that changes and modifications may be made thereto without departing from the invention in its broader aspects and as set forth in the following claims.

The invention claimed is:

1. A remote monitoring system, comprising:
a sensor configured to take measurements of vibration of an associated machine;
a data acquisition module configured to gather machine vibration data from said sensor;
an application server configured to perform calculations on said machine vibration data and in communication with said data acquisition module across a network;
a database in communication with said application server and configured to receive and store said machine vibration data from said data acquisition module across said network;
an interface configured to facilitate communication between a user and said application server, wherein said machine vibration data stored in said database is accessible to the user connected to said network in real-time; and
an alert notification engine configured such that when a parameter characterizing the machine vibration data calculated by said application server exceeds a predefined threshold value, one or more first alerts corresponding to said parameter are transmitted to one or more first users, and one or more additional alerts are transmitted to one or more second users if at least one of said first users fails to respond to said first alert within a predetermined time, wherein said first alerts and said additional alerts include diagnostic information informing the user that said parameter exceeds said threshold and indicating one or more causes of the exceeded threshold,
wherein when said parameter characterizing the machine vibration exceeds said threshold value, a rate at which the data acquisition module gathers the machine vibration data is increased.

2. The remote monitoring system of claim 1 wherein the application server is maintained in a first facility that is remote from a second facility in which said sensor and the associated machine is maintained.

3. The remote monitoring system of claim 1 wherein said application server includes a heap data structure configured for maintaining recent machine vibration data received by said application server, said recent machine vibration data being defined as data gathered within a time period defined by the user, and wherein said information contained in said heap data structure is transmitted to the user when said parameter exceeds said threshold.

4. The remote monitoring system of claim 3 wherein said database is configured to maintain historical machine data received by said application server.

5. The remote monitoring system of claim 3 wherein said interface is a graphical user interface configured to display a comparison between said recent machine vibration data and said historical machine vibration data.

6. The remote monitoring system of claim 1 wherein said interface is a graphical user interface embedded into a standard webpage.

7. The remote monitoring system of claim 6 wherein said graphical user interface is implemented using rich internet application software.

8. The remote monitoring system of claim 1 wherein said application server is configured to receive user requests for machine vibration data calculations or analysis and which is configured to present results to the user interface in real-time only in response to receipt of said user requests.

9. The remote monitoring system of claim 1 wherein said interface is a graphical user interface including a real-time status indicators for the machine vibration data associated with said sensor.

10. A remote monitoring system having an application server, the application server comprising:
  a data processing module configured to facilitate communication between a data acquisition module associated with a sensor configured to take measurements of vibration of an associated machine, a database, and a user interface, wherein the data processing module is configured to receive machine vibration data from the data acquisition module, send configurations to said data acquisition module, send and receive machine vibration data to and from the database, and perform calculations of parameters characterizing the machine vibration data as well as calculations necessary to present machine vibration data to a user;
  a graphical user interface configured to output machine vibration data to said user interface and further configured to receive and send to the application server user requests to calculate or analyze the machine data in real-time; and
  an alert notification engine configured such that when one of said calculated parameters characterizing the machine vibration data exceeds a predefined threshold value, one or more first alerts corresponding to said parameter are transmitted to one or more first users, and one or more additional alerts are transmitted to one or more second users if at least one of said first users fails to respond to said first alert within a predetermined time, wherein said first alerts and said additional alerts include diagnostic information informing the user that said parameter exceeds said threshold and indicating one or more causes of the exceeded threshold,
  wherein when said one of said calculated parameters characterizing the machine vibration exceeds said threshold value, a rate at which the machine vibration data is gathered from the data acquisition module is increased.

11. The remote monitoring system of claim 10 wherein said data processing module further includes a heap data structure wherein recent machine vibration data received from said data processing module is stored, said recent machine vibration data being defined as data gathered within a time period defined by the user, and wherein said information contained in said heap data structure is transmitted to the user when said parameter exceeds said threshold.

12. The remote monitoring system of claim 10 wherein said database is configured to store historical machine vibration data.

13. The remote monitoring system of claim 10 wherein said alert notification engine is further configured such that when the parameter characterizing the machine vibration data exceeds a predefined threshold value, an alert corresponding to the machine is output to said graphical user interface.

14. A method of remote monitoring, comprising the steps of:
  using a data acquisition module gathering a sensor signal from a sensor associated with a machine, said sensor configured to take measurements of vibration of said associated machine;
  the data acquisition module converting said sensor signal into the digital format and sending the machine vibration data to an application server over a network;
  the application server performing calculations on the machine vibration data and storing the machine vibration data in a memory;
  a user retrieving machine vibration data stored in the memory through a graphical user interface embedded into a standard webpage, wherein the user is remote from a facility housing the data acquisition module;
  transmitting a first alert to one or more first users when one or more parameters characterizing the machine vibration data exceeds a predefined threshold value; and
  transmitting one or more additional alerts to one or more second users if at least one of said first users fails to respond to said first alert within a predetermined time,
  wherein said first alerts and said additional alerts include diagnostic information informing the user that said parameter exceeds said threshold and indicating one or more causes of the exceeded threshold, and
  wherein when said one or more parameters characterizing the machine vibration exceeds said threshold value, a rate at which said data acquisition module gathers the machine vibration data is increased.

15. The method of claim 14 further comprising the steps of:
  the user submitting a request to analyze or calculate the machine vibration data via the graphical user interface; and
  the graphical user interface displaying machine vibration data based on the user's requests in real-time only in response to receipt of said user request.

16. The remote monitoring system of claim 10, where said first alerts and said additional alerts are transmitted as an SMS message.

17. The remote monitoring system of claim 10, wherein the remote monitoring system is configured to perform calculations on the machine vibration data that are necessary to present machine vibration data to the user only in response to receipt of said user request to view or analyze said vibration data.

18. The remote monitoring system of claim 5, wherein said graphical user interface is configured to display a historical trend of one or more aggregate parameters associated with said machine vibration data, and to accept a user selection selecting any displayed aggregate parameter value and requesting said application server to perform calculations on associated machine vibration data for further analysis or comparison with recent machine vibration data.

19. The remote monitoring system of claim 1 wherein said remote monitoring system includes at least one sensor and at least one data acquisition module that are portable and can be moved by an operator from one machine to another to collect machine vibration data in a route.

* * * * *